(12) United States Patent
Park et al.

(10) Patent No.: US 10,889,320 B2
(45) Date of Patent: Jan. 12, 2021

(54) ELECTRIC POWER-ASSISTED STEERING APPARATUS AND METHOD OF CONTROLLING THE SAME

(71) Applicant: MANDO CORPORATION, Gyeonggi-do (KR)

(72) Inventors: SeongHoon Park, Gyeonggi-do (KR); DuckHwan Kim, Gyeonggi-do (KR)

(73) Assignee: MANDO CORPORATION, Gyeonggi-do (KR)

( * ) Notice: Subject to any disclaimer, the term of this patent is extended or adjusted under 35 U.S.C. 154(b) by 236 days.

(21) Appl. No.: 16/045,666

(22) Filed: Jul. 25, 2018

(65) Prior Publication Data
US 2019/0039639 A1 Feb. 7, 2019

(30) Foreign Application Priority Data

Aug. 7, 2017 (KR) .................. 10-2017-0099404
Aug. 7, 2017 (KR) .................. 10-2017-0099405

(51) Int. Cl.
*B62D 5/04* (2006.01)
*B62D 6/00* (2006.01)

(52) U.S. Cl.
CPC ............ *B62D 5/0463* (2013.01); *B62D 6/00* (2013.01); *B62D 6/008* (2013.01)

(58) Field of Classification Search
CPC ......... B62D 5/0463; B62D 6/00; B62D 6/008
See application file for complete search history.

(56) References Cited

U.S. PATENT DOCUMENTS

2005/0049769 A1* 3/2005 Tsuchiya ............... B62D 6/003
701/41

* cited by examiner

*Primary Examiner* — Michael D Lang
(74) *Attorney, Agent, or Firm* — Ladas & Parry, LLP

(57) ABSTRACT

Provided are an electric power-assisted steering apparatus and a method of controlling the same. A lateral acceleration is calculated on the basis of an estimated rack force, and a target torque is calculated by using the calculated lateral acceleration and a target torque parameter set according to a vehicle velocity. Then, a compensation torque corresponding to a difference between the target torque and a driver torque is applied to uniformly maintain the feeling of steering even when a steering rate is changed. Also, a steering control logic based on a driver torque and a steering control logic based on a compensation torque are separated, thus facilitating steering control appropriate for steering circumstance.

18 Claims, 7 Drawing Sheets

ELECTRIC POWER-ASSISTED STEERING APPARATUS AND METHOD OF CONTROLLING THE SAME

CROSS REFERENCE TO RELATED APPLICATION

This application claims priority from Korean Patent Application Nos. 10-2017-0099404 & 10-2017-0099405, filed on Aug. 7, 2017 which are hereby incorporated by reference for all purposes as if fully set forth herein.

BACKGROUND OF THE INVENTION

1. Field of the Invention

The present disclosure relates to an electric power-assisted steering apparatus and a method of controlling the same.

2. Description of the Prior Art

An electric power-assisted steering apparatus provides power for assisting a vehicle driver's steering by generating a current for driving a motor.

As an example, when a steering wheel is manipulated by the vehicle driver, the electric power-assisted steering apparatus senses a steering torque according to the manipulation of the steering wheel and generates and applies a current for driving the motor according to the steering torque to the motor. When the driver's steering is assisted by such a motor driven according to the steering torque, the driver's steering control is facilitated, and proper steering is made possible depending on vehicle driving conditions.

Such an electric power-assisted steering apparatus generates a current for assisting a steering force according to a sensed steering torque, a current for reducing joggling caused by steering, and the like and drives the motor according to the generated currents.

Here, when an excessive current for reducing joggling caused by steering is output to maintain vehicle yaw stability, it is not problematic for general steering. On the other hand, in the case of rapid corrective steering at the on-center position, the feeling of steering is inconsistent because of a heavy torque.

Therefore, a method is required to uniformly maintain the feeling of steering in a general situation and a particular situation.

SUMMARY OF THE INVENTION

The present disclosure is to provide an electric power-assisted steering apparatus for uniformly maintaining a driver's feeling of steering when a motor is driven according to a steering torque caused by the driver's steering, and a method of controlling the same.

Also, the present disclosure is to provide an electric power-assisted steering apparatus for separately controlling steering in a particular situation and a general situation, and a method of controlling the same.

An embodiment provides an electric power-assisted steering apparatus including: a rack force estimator configured to estimate a rack force by using a driver torque and a motor torque; a target torque calculator configured to calculate a lateral acceleration by using the rack force and a lateral acceleration parameter determined according to a vehicle velocity and calculate a target torque by using the lateral acceleration and one or more target torque parameters determined according to the vehicle velocity; and a motor controller configured to output a motor current for controlling a motor according to a compensation torque corresponding to a difference between the target torque and the driver torque.

The target torque calculator of the electric power-assisted steering apparatus may calculate the lateral acceleration by dividing the rack force by the lateral acceleration parameter.

The target torque calculator may calculate the target torque by using the target torque parameters including a first parameter for determining buildup of the target torque, a second parameter for determining a level of the target torque, and a third parameter for determining the target torque at an off-center position.

Here, the target torque calculator may generate a target torque map by using the first parameter, the second parameter, and the third parameter determined according to the lateral acceleration and the vehicle velocity and calculate a target torque corresponding to the lateral acceleration from the target torque map.

The electric power-assisted steering apparatus may further include a steering controller configured to calculate a motor current for controlling the motor according to the driver torque, and the motor controller may add the motor current calculated by the steering controller and the motor current dependent on the compensation torque to output the added motor current.

Here, at least one of the rack force estimator and the target torque calculator may be turned on or off independently from the steering controller.

As an example, the target torque calculator may maintain an on-state when the steering wheel is on center, and may maintain an off-state when the steering wheel is off center, such that the motor may be controlled by the steering controller.

Another embodiment provides a method of controlling such an electric power-assisted steering apparatus, the method including: estimating a rack force by using a driver torque and a motor torque; calculating a lateral acceleration by using the rack force and a lateral acceleration parameter determined according to a vehicle velocity; calculating a target torque by using the lateral acceleration and one or more target torque parameters determined according to the vehicle velocity; and outputting a motor current for controlling a motor according to a compensation torque corresponding to a difference between the target torque and the driver torque.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
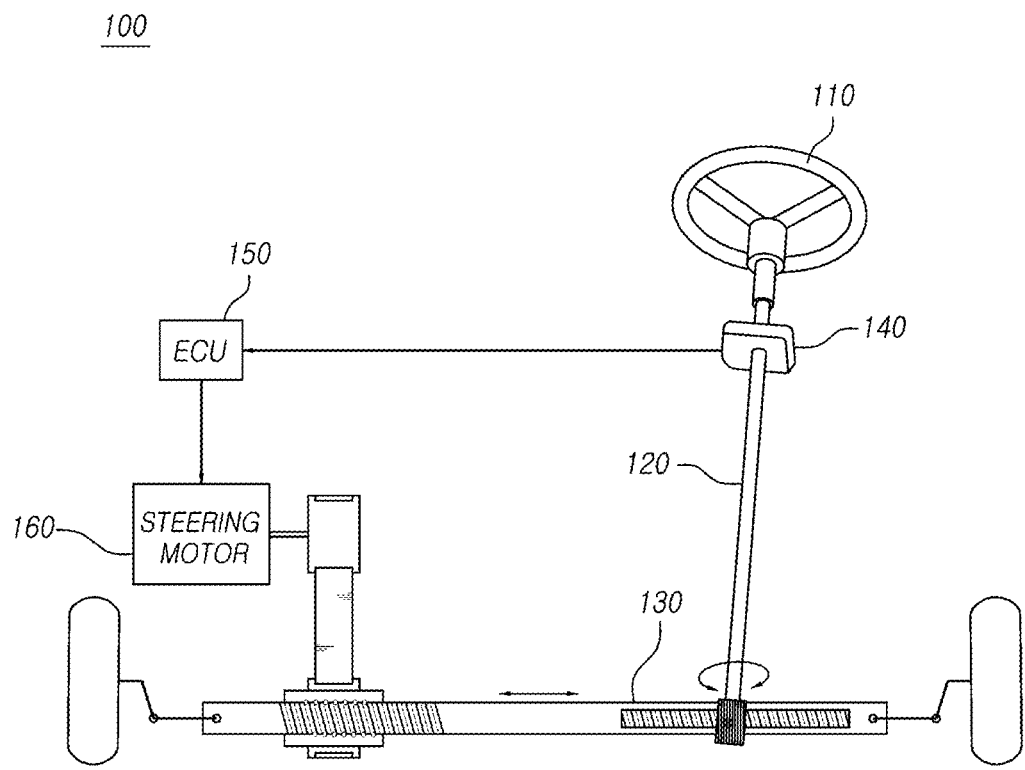
FIG. 1 shows a schematic configuration of an electric power-assisted steering apparatus according to embodiments of the present disclosure.

Hereinafter, embodiments of the present disclosure will be described in detail with reference to the accompanying drawings. In adding reference numerals to elements in each drawing, the same elements will be designated by the same reference numerals if possible, although they may be shown in different drawings. Further, in the following description of the present disclosure, a detailed description of known functions and configurations incorporated herein will be omitted when it is determined that the description may make the subject matter of the present disclosure rather unclear.

In describing elements of embodiments of the present disclosure, terms such as "first," "second," "A," "B," "(a)," and "(b)" may be used. Such terms are used only to distinguish an element from another element, but do not limit the substance, sequence, order, or the like of elements. It should be noted that when one component is described as being "connected," "coupled," or "joined" to another component, still another component may be "connected," "coupled," or "joined" between the two components, even though the component may be directly "connected," "coupled," or "joined" to the other component.

FIG. 1 shows a schematic configuration of an electric power-assisted steering apparatus 100 according to embodiments of the present disclosure.

Referring to FIG. 1, the electric power-assisted steering apparatus 100 according to embodiments of the present disclosure includes a steering wheel 110, a steering shaft 120, a rack bar 130, a torque sensor 140, a controller 150, and a steering motor 160.

The steering wheel 110 is connected to one end of the steering shaft 120 and rotated according to a driver's manipulation.

The end of the steering shaft 120 is connected to the steering wheel 110, and the other end is connected to the rack bar 130. When the steering wheel 110 is rotated according to the driver's manipulation, the steering shaft 120 rotates by rotation of the steering wheel 110 and moves the rack bar 130.

Here, a torque caused by rotation of the steering wheel 110 is referred to as a "driver torque."

To assist such a driver's steering, the driver torque is sensed, and auxiliary power is provided according to the sensed driver torque, such that the driver's steering control may be facilitated.

When the steering wheel 110 is rotated by the driver's manipulation, the torque sensor 140 senses the driver torque and transfers the sensed driver torque to the controller 150.

The controller 150 performs control for assisting the driver's steering on the basis of the sensed driver torque.

The controller 150 calculates a current for driving the steering motor 160 on the basis of the driver torque and drives the steering motor 160 by outputting the calculated current, thereby performing control for assisting the driver's steering.

Here, a torque caused by operation of the steering motor 160 is referred to as a "motor torque."

For example, to assist the driver's steering, the controller 150 may output a current for adding a torque in a steering direction of the driver. Also, to prevent joggling caused by the driver's steering, the controller 150 may output a current for controlling the steering motor 160. Moreover, the controller 150 may output a current for assisting the steering wheel 110 to its original position after the driver's steering.

The steering motor 160 is driven according to a current output by the controller 150 and causes the rack bar 130 to move, thereby facilitating the driver's steering.

Here, when a control logic for assisting the driver's steering is overprocessed by the controller 150, the driver's feeling of steering may not be uniform.

As an example, when a control logic for preventing joggling caused by the driver's steering is overprocessed to maintain vehicle yaw stability, rapid corrective steering at the on-center position may make the feeling of steering inconsistent because of a heavy torque.

The electric power-assisted steering apparatus 100 according to embodiments of the present disclosure provides a method of uniformly maintaining a driver's feeling of steering when a logic for assisting the driver's steering is performed.

Figure 2:
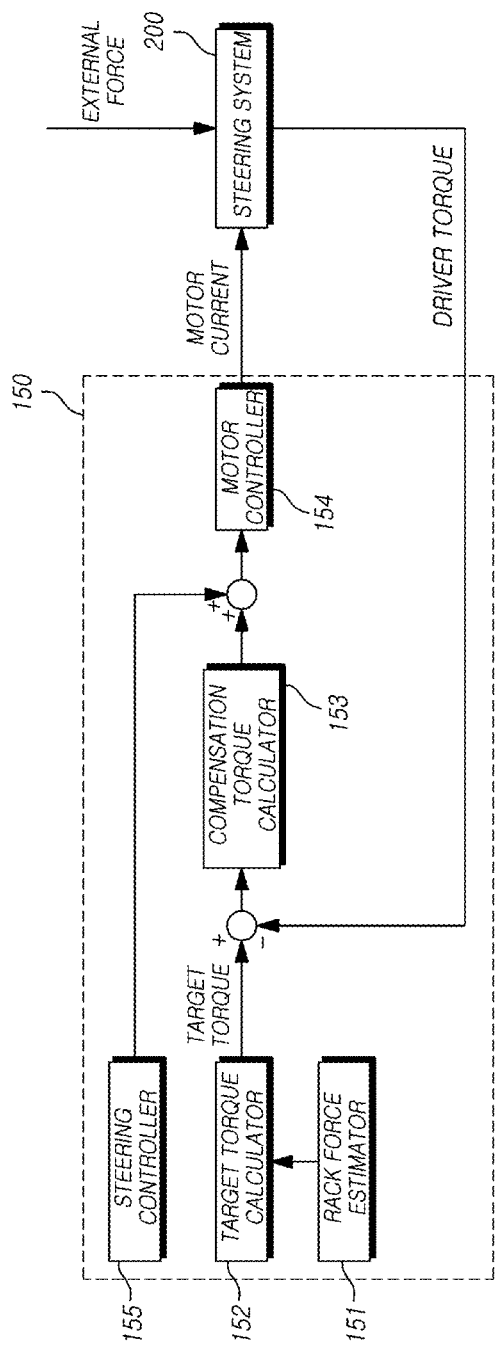
FIG. 2 is a diagram showing an example of a configuration of a controller in an electric power-assisted steering apparatus according to embodiments of the present disclosure.

FIG. 2 is a diagram showing an example of a detailed configuration of the controller 150 in the electric power-assisted steering apparatus 100 according to embodiments of the present disclosure.

Referring to FIG. 2, the controller 150 of the electric power-assisted steering apparatus 100 according to embodiments of the present disclosure includes a rack force estimator 151, a target torque calculator 152, a compensation torque calculator 153, a motor controller 154, and a steering controller 155.

The rack force estimator 151 estimates a rack force by using a driver torque generated by a driver's steering and a motor torque generated by the steering motor 160.

For example, the rack force estimator 151 may estimate a rack force by using the sum of the driver torque and the motor torque.

The target torque calculator 152 calculates a target torque by using the rack force estimated by the rack force estimator 151 and parameters set according to a vehicle velocity.

Specifically, the target torque calculator 152 may calculate a lateral acceleration by using the rack force and lateral acceleration parameters set according to a vehicle velocity, and may calculate the lateral acceleration as shown in Equation 1 below.

$$Ay = \frac{RF}{Ca} \quad \text{[Equation 1]}$$

Here, Ay denotes a lateral acceleration, RF denotes a rack force, and Ca denotes a lateral acceleration parameter set according to a vehicle velocity.

In other words, when the rack force RF is estimated by the rack force estimator 151, the target torque calculator 152 may calculate the lateral acceleration Ay by using the estimated rack force RF and the lateral acceleration parameter Ca set according to the vehicle velocity.

When the lateral acceleration is calculated, the target torque calculator 152 calculates a target torque by using the lateral acceleration and one or more target torque parameters set according to the vehicle velocity.

Here, the one or more target torque parameters may include a first parameter for determining buildup of the target torque, a second parameter for determining an overall level of the target torque, and a third parameter for determining the target torque at an off-center position.

The target torque calculator 152 may calculate a target torque by using the aforementioned first, second, and third parameters, and the target toque may be calculated as shown in Equation 2 below.

$$Td = \frac{1}{\frac{Da}{Ay} + Ka} + Gr \cdot Ay \qquad \text{[Equation 2]}$$

Here, Td denotes a target torque, and Ay denotes a lateral acceleration. Da denotes the first parameter, Ka denotes the second parameter, and Gr denotes the third parameter.

When the lateral acceleration Ay is calculated, the target torque calculator 152 may generate a target torque map by using the lateral acceleration Ay, the first parameter Da, the second parameter Ka, and the third parameter Cr set according to the vehicle velocity, and calculate a target torque corresponding to the calculated lateral acceleration Ay from the target torque map.

In other words, it is possible to calculate a target torque Td through an equation between the target torque Td and the lateral acceleration Ay in which one or more target torque parameters set according to the vehicle velocity are used.

When the target torque is calculated, the target torque calculator 152 transfers the calculated target torque to the compensation torque calculator 153.

The compensation torque calculator 153 receives the target torque calculated by the target torque calculator 152 and is fed back with a driver torque generated by the driver's steering control.

The compensation torque calculator 153 compares the target torque and the driver torque and calculates a compensation torque corresponding to a difference between the target torque and the driver torque. Then, the compensation torque calculator 153 calculates a motor current corresponding to the compensation torque to output the motor current to the motor controller 154.

In other words, the compensation torque calculator 153 performs a logic for controlling the steering motor 160 in a direction for reducing the difference between the target torque and the driver torque.

The motor controller 154 receives the motor current value calculated by the compensation torque calculator 153 and outputs a motor current according to the received motor current value. Accordingly, a compensation torque corresponding to the difference between the target torque and the driver torque is applied so that steering control may be performed.

Here, the motor controller 154 may add the motor current value according to the compensation torque calculated by the compensation torque calculator 153 and a motor current value output by the steering controller 155 and output a motor current.

Also, the motor controller 154 may compare the difference between the target torque and the driver torque with a threshold value, and output a motor current for controlling the motor according to the compensation torque corresponding to the difference between the target torque and the driver torque when the difference is greater than the threshold value. In other words, the motor controller 154 maintains the driver torque at a certain level or above on the basis of the target torque.

When the driver torque is generated by the driver's manipulation of the steering wheel 110, the steering controller 155 calculates the motor current value for assisting the driver's steering on the basis of the driver torque.

The motor current value calculated by the steering controller 155 may be intended to assist the driver's steering, prevent joggling caused by steering, or assist return from a steered state.

Therefore, the steering motor 160 is controlled through the steering controller 155 on the basis of the driver torque, but a logic for compensating for the difference between the driver torque and the target torque calculated on the basis of the lateral acceleration is separately performed, so that the feeling of steering may be prevented from being inconsistent due to steering control based on the driver torque.

Also, a steering control logic based on a driver torque and a steering control logic based on a compensation torque for compensating for the driver torque are separately performed to facilitate steering control and control of driver torque compensation.

Figure 3:
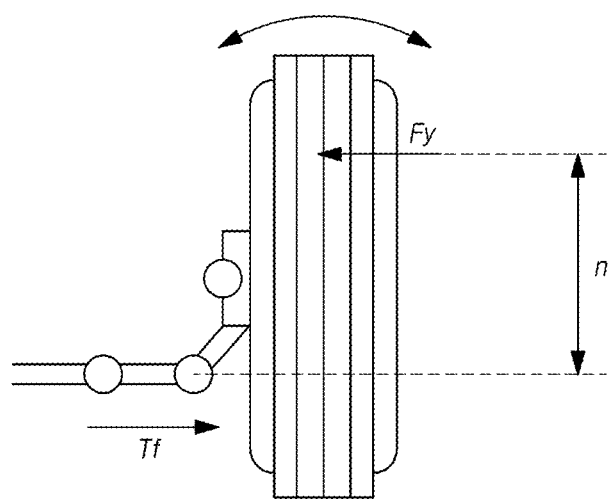
FIG. 3 is a diagram illustrating a method in which an electric power-assisted steering apparatus according to embodiments of the present disclosure calculates a lateral acceleration.

FIG. 3 is a diagram illustrating a method in which the electric power-assisted steering apparatus 100 according to embodiments of the present disclosure calculates a lateral acceleration.

Referring to FIG. 3, Tf denotes a torque applied to the steering shaft 120, and Fy denotes a rack force applied to front wheels. Also, n denotes the sum of a trail caster and a pneumatic trail.

A relationship equation between a rack force and a lateral acceleration may be derived from the definition of a theoretical tyre reaction force, which may be represented by the following equations.

$$Tf = Fy \times n \qquad \text{[Equation 3]}$$

$$Td \times As \times Is = Tf \qquad \text{[Equation 4]}$$

$$Fy = Mf \times Ay \qquad \text{[Equation 5]}$$

Here, As denotes a steering assist ratio, and Is denotes a steering ratio. Mf denotes a vehicle weight applied to front wheels, Ay denotes a lateral acceleration applied to the front wheels, Rf denotes a rack force, and Ca denotes a lateral acceleration parameter.

The lateral acceleration parameter Ca is measured to be Td/Ay according to a vehicle velocity when As=1 and no power is supplied.

Equation 6 below may be derived from Equations 3 to 5 described above.

$$Td \times As = Ca \times Ay(Ca = Mf \times n/Is) \qquad \text{[Equation 6]}$$

When it is defined that Td×As=RF, Equation 7 below may be derived.

$$Ay = \frac{RF}{Ca} \qquad \text{[Equation 7]}$$

In other words, it is possible to calculate a lateral acceleration by dividing an estimated rack force by the lateral acceleration parameter set according to the vehicle velocity.

Figure 4:
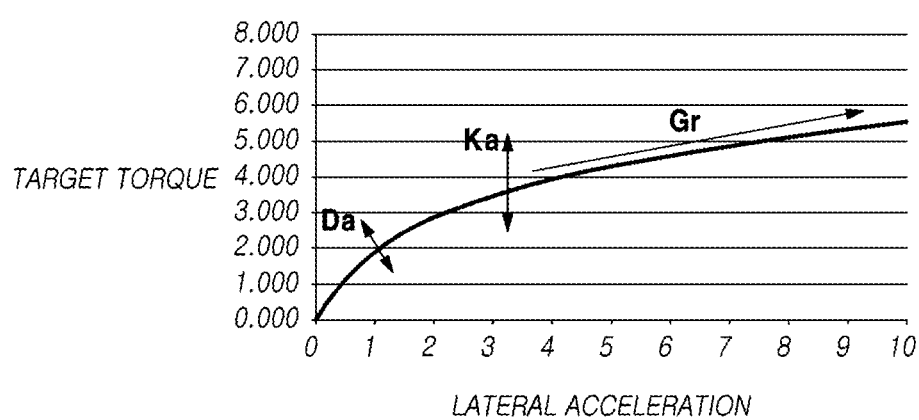
FIG. 4 is a graph illustrating a method in which an electric power-assisted steering apparatus according to embodiments of the present disclosure calculates a target torque.

FIG. 4 is a graph illustrating a method in which the electric power-assisted steering apparatus 100 according to embodiments of the present disclosure calculates a target torque.

FIG. 4 shows a relationship between a lateral acceleration set on the basis of a target torque parameter and a target torque.

The relationship between a lateral acceleration and a target torque may be represented as shown in Equation 8 below.

$$Td = \frac{1}{\frac{Da}{Ay} + Ka} + Gr \cdot Ay \quad \text{[Equation 8]}$$

Here, Td denotes a target torque, Ay denotes a lateral acceleration, Da denotes a first parameter, Ka denotes a second parameter, and Gr denotes a third parameter.

Da is a parameter for determining a buildup level of the target torque, Ka is a parameter for determining an overall level of the target torque, and Gr is a parameter for determining the target torque at an off-center position.

A target torque map which represents the relationship between a lateral acceleration and a target torque may be generated by using the parameters Da, ka, and Gr which are set according to a vehicle velocity, and a target torque may be calculated on the basis of a calculated lateral acceleration from the generated target torque map.

Therefore, according to embodiments of the present disclosure, a target torque is calculated by using a lateral acceleration, which is calculated through an estimated rack force, and target torque parameters, which are set according to a vehicle velocity, and a logic for compensating for a driver torque on the basis of the target torque is performed. In this way, it is possible to prevent the feeling of steering from being inconsistent and maintain the consistent feeling of steering when steering is controlled by a driver torque.

Meanwhile, the electric power-assisted steering apparatus 100 according to embodiments of the present disclosure may separately perform a logic for calculating a target torque and applying a compensation torque and a steering control logic based on a driver torque.

Accordingly, a compensation torque may be applied only when it is necessary to apply a compensation torque.

Figure 5:
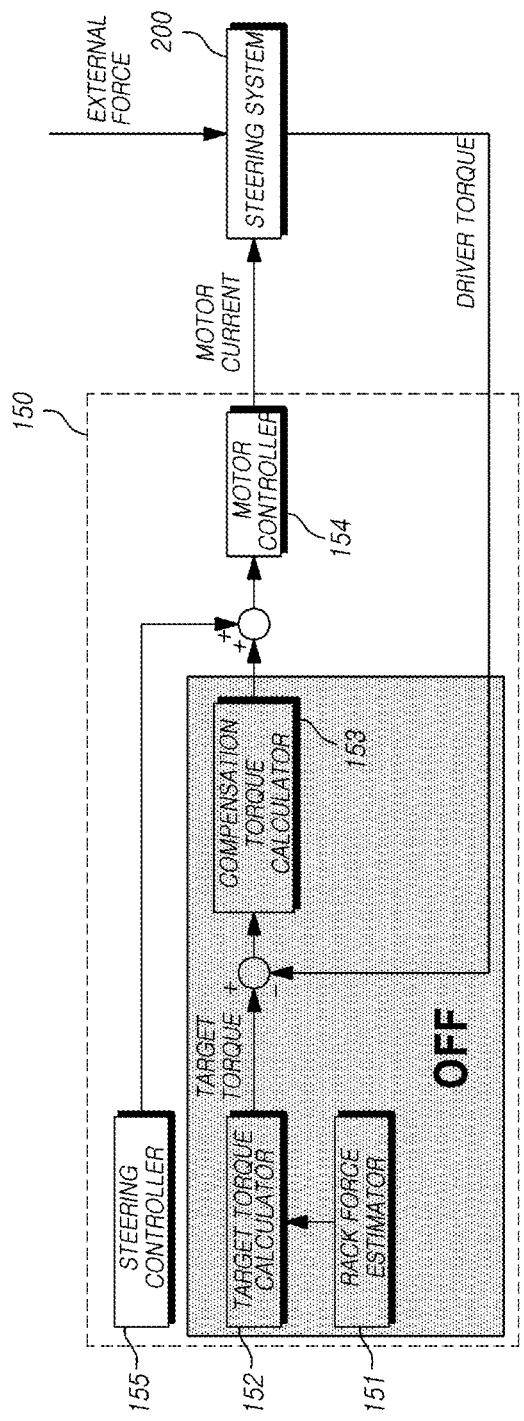
FIG. 5 is a diagram showing an example of an operating method of an electric power-assisted steering apparatus according to embodiments of the present disclosure.

FIG. 5 shows an example of an operation of the controller 150 in the electric power-assisted steering apparatus 100 according to embodiments of the present disclosure.

Referring to FIG. 5, in the controller 150 of the electric power-assisted steering apparatus 100 according to embodiments of the present disclosure, the rack force estimator 151, the target torque calculator 152, and the compensation torque calculator 153 may maintain an on-state only in a certain steering situation and may be in an off-state in other situations.

As an example, components for calculating a compensation torque may maintain the on-state only when the steering wheel 110 is on center, and may otherwise be in the off-state.

Alternatively, the components may maintain the on-state only when rapid corrective steering is performed at the on-center position, and may otherwise be in the off-state.

Therefore, while the rack force estimator 151, the target torque calculator 152, and the compensation torque calculator 153 are in the on-state, the steering motor 160 is controlled on the basis of a driver torque and a compensation torque dependent on a target torque at the same time, such that the driver's feeling of steering may be uniformly maintained.

On the other hand, while the rack force estimator 151, the target torque calculator 152, and the compensation torque calculator 153 are in the off-state, the steering controller 155 controls the steering motor 160 on the basis of a driver torque alone. In this way, power consumption is reduced, and a compensation torque may be applied according to circumstances.

In other words, according to embodiments of the present disclosure, compensation control is performed according to a target torque based on a lateral acceleration, but a control logic based on a driver torque and a control logic based on the target torque are independently performed, such that a steering control logic appropriate for a steering circumstance may be performed.

Figure 6:
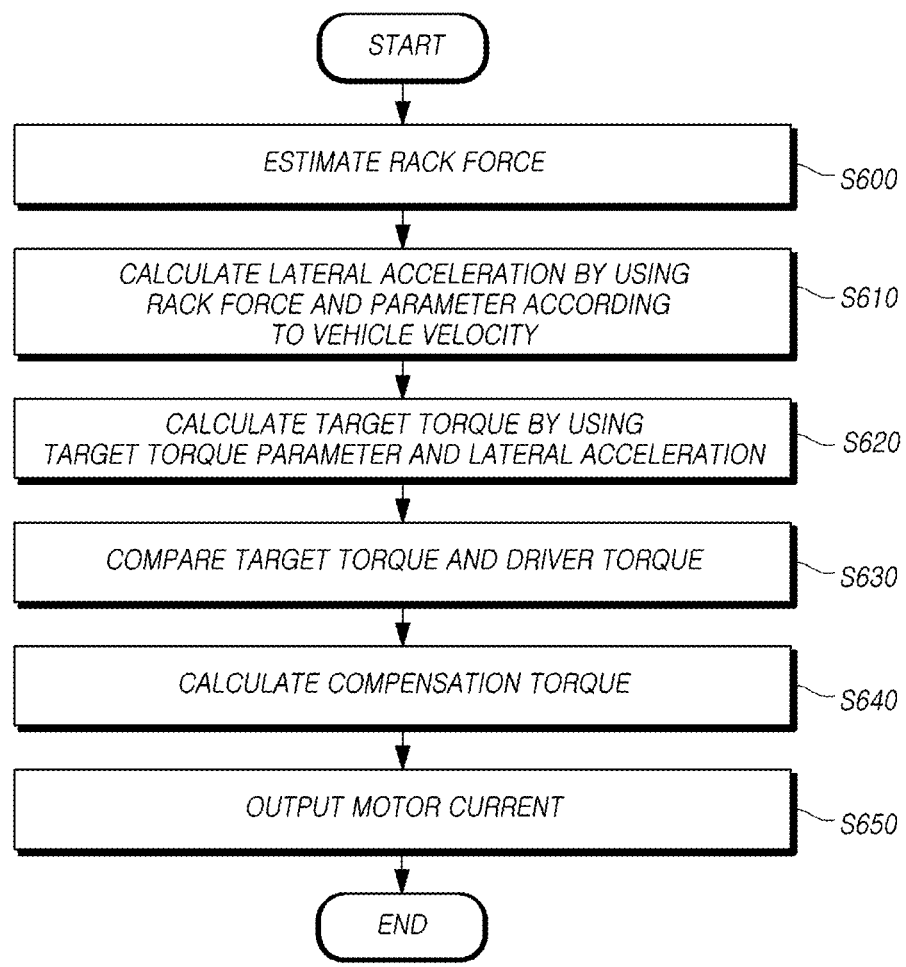
FIG. 6 is a flowchart illustrating a method of controlling an electric power-assisted steering apparatus according to embodiments of the present disclosure.

FIG. 6 is a flowchart illustrating a method of controlling the electric power-assisted steering apparatus 100 according to embodiments of the present disclosure.

Referring to FIG. 6, the electric power-assisted steering apparatus 100 according to embodiments of the present disclosure estimates a rack force by using a driver torque and a motor torque (S600).

The electric power-assisted steering apparatus 100 calculates a lateral acceleration by using the estimated rack force and a lateral acceleration parameter set according to a vehicle velocity (S610). Here, the lateral acceleration may be calculated by dividing the rack force by the lateral acceleration parameter.

The electric power-assisted steering apparatus 100 calculates a target torque by using the calculated lateral acceleration and one or more target torque parameters set according to the vehicle velocity (S620). The one or more target torque parameters may include a first parameter for determining buildup of the target torque, a second parameter for determining an overall level of the target torque, and a third parameter for determining the target torque at an off-center position.

The electric power-assisted steering apparatus 100 may generate a target torque map by using the target torque parameters and calculate a target torque corresponding to the calculated lateral acceleration from the target torque map.

The electric power-assisted steering apparatus 100 is fed back with a driver torque and compares the fed-back driver torque with the calculated target torque (S630).

Then, the electric power-assisted steering apparatus 100 calculates a compensation torque corresponding to a difference between the target torque and the driver torque (S640) and controls the steering motor 160 by outputting a motor current corresponding to the compensation torque (S650).

Figure 7:
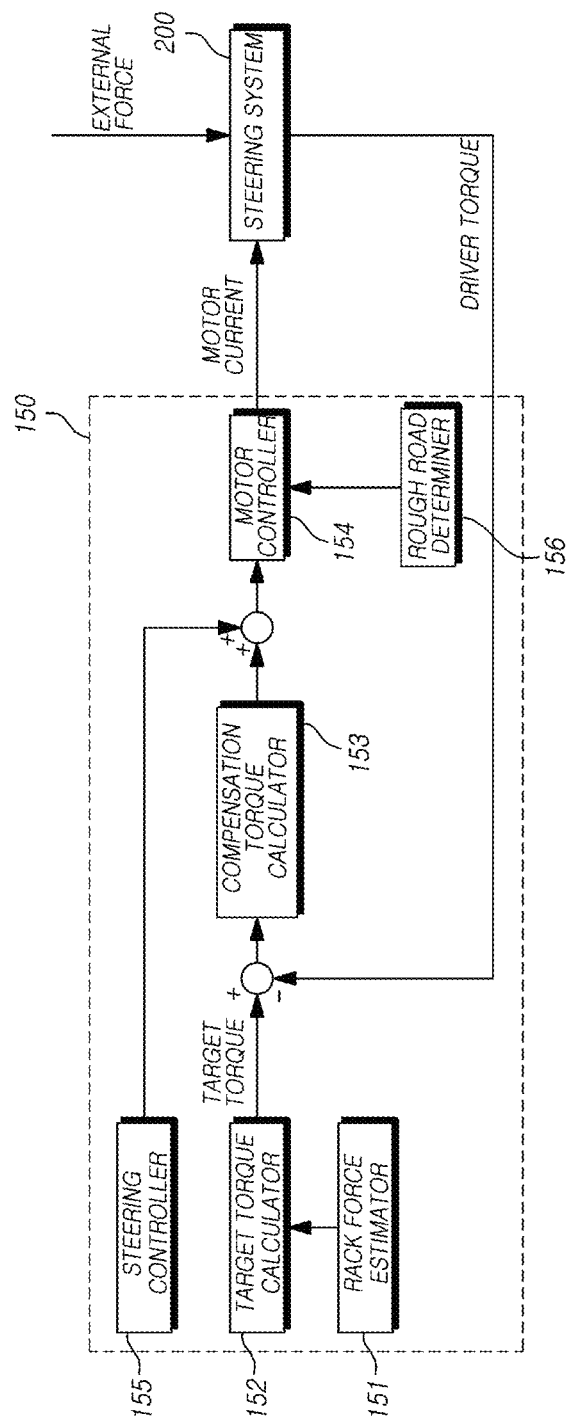
FIG. 7 is a diagram showing another example of an operating method of an electric power-assisted steering apparatus according to embodiments of the present disclosure.

FIG. 7 is a diagram showing another example of an operating method of an electric power-assisted steering apparatus according to embodiments of the present disclosure.

Referring to FIG. 7, a rough road determiner 156 is additionally included in the electric power-assisted steering apparatus described with reference to FIG. 2.

The rough road determiner 156 may compare a change rate of a rack force estimated by the rack force estimator 151 and a rough road determination reference value and generate a rough road determination flag when the change rate of the rack force is the rough road determination reference value or more. Generation of a rough road determination flag may denote changing a rough road determination flag from 0 to 1.

Here, the rough road determination reference value may be determined on the basis of at least one of a vehicle velocity and a steering angle.

As an example, the rough road determination reference value may be set to a value inversely proportional to a velocity of a traveling vehicle. An increase in the velocity of the traveling vehicle reduces friction against a road, and thus a change rate of a rack force may be reduced even when the vehicle travels on a rough road. Therefore, when a vehicle velocity increases, the rough road determination reference value is reduced so that whether the vehicle is traveling on a rough road may be accurately determined even when the change rate of the rack force is affected by a change in the vehicle velocity.

As another example, the rough road determination reference value may be set to a value proportional to a steering angle of a traveling vehicle. When the vehicle travels with a large steering angle, the change rate of the rack force may be large in spite of a slightly uneven road surface. Therefore, when a steering angle increases, the rough road determination reference value is increased so that whether the vehicle is traveling on a rough road may be accurately determined regardless of steering of the vehicle.

As an example of generating a rough road determination flag by using a rough road determination reference value, when the change rate of the rack force is the rough road determination reference value or more for a preset time or more, a rough road determination flag may be generated.

In other words, even when the change rate of the rack force is momentarily the rough road determination reference value or more, the vehicle may not be traveling on a rough road. Therefore, when the change rate of the rack force is kept greater than or equal to the rough road determination reference value for the preset time or more, it is possible to determine that the vehicle is traveling on a rough road.

As another example of generating a rough road determination flag by using a rough road determination reference value, when a time in which the change rate of the rack force is the rough road determination reference value or more occupies a certain ratio or more in a preset time, a rough road determination flag may be generated.

Since the rough road determination reference value is dynamically changed according to vehicle driving conditions, the change rate of the rack force may momentarily be a smaller value than the rough road determination reference value even when the vehicle travels on a rough road. Therefore, when a time in which the change rate of the rack force is the rough road determination reference value or more occupies the certain ratio or more in the preset time, it is determined that the vehicle is traveling on a rough road such that whether the vehicle is traveling on a rough road may be accurately determined even when the dynamically changed rough road determination reference value is used.

When the rough road determination flag is generated, the rough road determiner 156 may transfer information that a rough road determination flag has been generated to the motor controller 154. When the rough road determination flag is generated, the motor controller 154 may output a motor current for controlling the motor according to a compensation torque corresponding to a difference between a target torque and a driver torque.

Therefore, according to embodiments of the present disclosure, a target torque map is generated by using a lateral acceleration calculated on the basis of an estimated rack force and a target torque parameter set according to a vehicle velocity, and a target torque is calculated by using the generated target torque map, such that a compensation torque may be applied according to the target torque. Accordingly, when a driver controls steering, the feeling of steering may be uniformly maintained.

In other words, a target torque is generated on the basis of a rack force and used to compensate for a change in a current value of a steering control logic according to a steering rate so that the feeling of steering may be uniformly maintained in spite of a change in the steering rate.

As described above, according to embodiments of the present disclosure, a lateral acceleration is calculated on the basis of an estimated rack force, a target torque is calculated by using the lateral acceleration and a parameter set according to a vehicle velocity, and a logic for compensating for a difference between the target torque and a driver torque is performed, such that the feeling of steering may be uniformly maintained upon rapid corrective steering at the on-center position.

According to embodiments of the present disclosure, a logic for controlling a target torque, which is calculated on the basis of a lateral acceleration, is performed separately from a logic for controlling a motor according to a driver torque such that a steering control logic may be independently performed according to steering circumstances.

The above embodiments of the present disclosure have been described only for illustrative purposes, and those skilled in the art will appreciate that various modifications and changes may be made thereto without departing from the scope and spirit of the disclosure. Therefore, the embodiments of the present disclosure are not intended to limit, but are intended to illustrate the technical idea of the present disclosure, and the scope of the technical idea of the present disclosure is not limited by the embodiments. The scope of the present disclosure shall be construed on the basis of the accompanying claims in such a manner that all of the technical ideas included within the scope equivalent to the claims belong to the present disclosure.

What is claimed is:

1. An electric power-assisted steering apparatus, the apparatus comprising:
   a rack force estimator configured to estimate a rack force by using a driver torque and a motor torque;
   a target torque calculator configured to calculate a lateral acceleration by using the rack force and a lateral acceleration parameter determined according to a vehicle velocity and calculate a target torque by using the lateral acceleration and one or more target torque parameters determined according to the vehicle velocity; and
   a motor controller configured to output a motor current for controlling a motor according to a compensation torque corresponding to a difference between the target torque and the driver torque.

2. The electric power-assisted steering apparatus of claim 1, wherein the target torque calculator calculates the lateral acceleration by dividing the rack force by the lateral acceleration parameter.

3. The electric power-assisted steering apparatus of claim 1, wherein the target torque calculator calculates the target torque by using the target torque parameters including a first parameter for determining buildup of the target torque, a second parameter for determining a level of the target torque, and a third parameter for determining the target torque at an off-center position.

4. The electric power-assisted steering apparatus of claim 3, wherein the target torque calculator generates a target torque map by using the first parameter, the second parameter, and the third parameter determined according to the lateral acceleration and the vehicle velocity and calculates a target torque corresponding to the lateral acceleration from the target torque map.

5. The electric power-assisted steering apparatus of claim 1, further comprising a steering controller configured to calculate a motor current for controlling the motor according to the driver torque,
wherein the motor controller adds the motor current calculated by the steering controller and the motor current dependent on the compensation torque to output the added motor current.

6. The electric power-assisted steering apparatus of claim 5, wherein at least one of the rack force estimator and the target torque calculator is turned on or off independently from the steering controller.

7. The electric power-assisted steering apparatus of claim 6, wherein the target torque calculator maintains an on-state when a steering wheel is on center, and maintains an off-state when the steering wheel is off center.

8. The electric power-assisted steering apparatus of claim 1, wherein the rack force estimator estimates the rack force by adding a force generated by the driver torque, which is generated according to rotation of a steering wheel, and a force generated by the motor torque, which is generated to assist steering according to the rotation of the steering wheel.

9. The electric power-assisted steering apparatus of claim 1, wherein the motor controller compares the difference between the target torque and the driver torque with a threshold value and outputs a motor current for controlling the motor according to the compensation torque corresponding to the difference between the target torque and the driver torque when the difference is greater than the threshold value.

10. The electric power-assisted steering apparatus of claim 1, further comprising a rough road determiner configured to compare a change rate of the rack force with a rough road determination reference value and generates a rough road determination flag when the change rate of the rack force is greater than or equal to the rough road determination reference value,
wherein the rough road determination reference value is determined based on at least one of the vehicle velocity and a steering angle, and
the motor controller outputs the motor current for controlling the motor according to the compensation torque corresponding to the difference between the target torque and the driver torque when the rough road determination flag is generated.

11. A method of controlling an electric power-assisted steering apparatus, the method comprising:
estimating a rack force by using a driver torque and a motor torque;
calculating a lateral acceleration by using the rack force and a lateral acceleration parameter determined according to a vehicle velocity;
calculating a target torque by using the lateral acceleration and one or more target torque parameters determined according to the vehicle velocity; and
outputting a motor current for controlling a motor according to a compensation torque corresponding to a difference between the target torque and the driver torque.

12. The method of claim 11, wherein the calculating of the lateral acceleration comprises calculating the lateral acceleration by dividing the rack force by the lateral acceleration parameter.

13. The method of claim 11, wherein the calculating of the target torque comprises calculating the target torque by using the target torque parameters including a first parameter for determining buildup of the target torque, a second parameter for determining a level of the target torque, and a third parameter for determining the target torque at an off-center position.

14. The method of claim 13, wherein the calculating of the target torque comprises:
generating a target torque map by using the first parameter, the second parameter, and the third parameter determined according to the lateral acceleration and the vehicle velocity; and
calculating the target torque corresponding to the lateral acceleration from the target torque map.

15. The method of claim 11, wherein the outputting of the motor current comprises:
calculating a motor current for controlling the motor according to the driver torque; and
adding the calculated motor current and the motor current dependent on the compensation torque to output the added motor current.

16. The method of claim 11, wherein the estimating of the rack force comprises estimating the rack force by adding a force generated by the driver torque, which is generated according to rotation of a steering wheel, and a force generated by the motor torque, which is generated to assist steering according to the rotation of the steering wheel.

17. The method of claim 11, further comprising comparing the difference between the target torque and the driver torque with a threshold value,
wherein the outputting of the motor current comprises outputting the motor current for controlling the motor according to the compensation torque corresponding to the difference between the target torque and the driver torque when the difference is greater than the threshold value.

18. The method of claim 11, further comprising comparing a change rate of the rack force with a rough road determination reference value and generating a rough road determination flag when the change rate of the rack force is greater than or equal to the rough road determination reference value,
wherein the rough road determination reference value is determined based on at least one of the vehicle velocity and a steering angle, and
wherein the outputting of the motor current comprises outputting the motor current for controlling the motor according to the compensation torque corresponding to the difference between the target torque and the driver torque when the rough road determination flag is generated.

* * * * *